Figure 1:
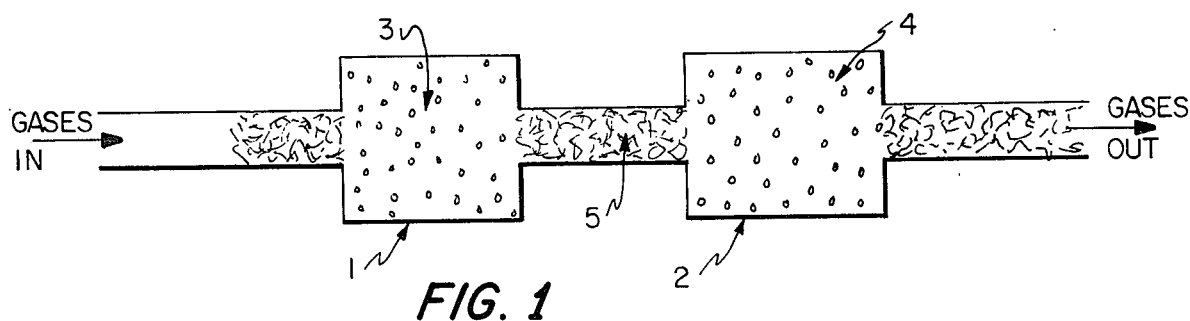

United States Patent [19]

Bramer et al.

[11] 4,041,128

[45] Aug. 9, 1977

[54] METHOD FOR PURIFICATION OF EXHAUST GASES

[75] Inventors: Henry C. Bramer, Venetia; Edward Shapiro, Pittsburgh, both of Pa.

[73] Assignee: Pittsburgh Environmental and Energy Systems, Inc., Pleasant Hills, Pa.

[21] Appl. No.: 605,558

[22] Filed: Aug. 18, 1975

[51] Int. Cl.$^2$ ............................................. B01D 53/34
[52] U.S. Cl. .............................. 423/213.2; 423/213.5; 423/239
[58] Field of Search .................. 423/213.2, 213.5, 239, 423/244; 252/439

[56] References Cited

U.S. PATENT DOCUMENTS

| | | |
|---|---|---|
| 3,840,389 | 10/1974 | Kobylinski et al. ............... 423/213.5 |
| 3,857,921 | 12/1974 | Tamura et al. ..................... 423/213.5 |
| 3,933,979 | 8/1973 | Eisenlohr et al. ................... 423/239 |
| 3,987,146 | 10/1976 | Clay et al. ............................ 423/239 |

*Primary Examiner*—G. O. Peters
*Attorney, Agent, or Firm*—James J. Brown

[57] ABSTRACT

A process and apparatus are provided whereby sulfur and nitrogen oxides as well as carbon monoxides and unburned hydrocarbons are removed from internal combustion engine exhaust gases. The gases are passed through a chamber containing a sulfide and an oxide of iron, copper or zinc. The system is partially self-regenerating and can be used in conjunction with present catalytic converter units or in lieu thereof. In certain embodiments the present invention can also replace muffler units in exhaust systems.

4 Claims, 10 Drawing Figures

METHOD FOR PURIFICATION OF EXHAUST GASES

The present invention is directed to a process and apparatus for the removal of sulfur and nitrogen oxides, carbon monoxides and hydrocarbons from the exhaust gases of internal combustion engines. More specifically, the present invention is directed to a process and apparatus which can be used either alone or in conjunction with catalytic converters to specifically remove unburned hydrocarbons, nitrogen oxides, carbon monoxide and sulfur dioxide from the exhaust gas of internal combustion engines. A particular feature of the present invention is that it can be used in conjunction with catalytic converters such as those presently being installed in the exhaust systems of automobiles to remove sulfur oxides from the exhaust gas which would otherwise either go untreated or be converted in the catalytic converter to sulfuric acid and/or sulfates which are emitted into the atmosphere.

One of the most important environmental problems in the United States is the generation and release into the atmosphere of unburned hydrocarbons, nitorgen oxides, carbon monoxide and sulfur dioxide from the combustion of fuels in internal combustion engines. Catalytic converters which are presently being installed in the exhaust systems of internal combustion engines used in motor vehicles have been shown to be effective in eliminating unburned hydrocarbons, nitrogen oxides and carbon monoxides by reduction of the nitrogen oxides and oxidation of the hydrocarbons and carbon monoxide. The sulfur dioxide which is present in the exhaust, however, is converted first to sulfur trioxide and then to sulfuric acid which poisons the catalyst in the converter and releases the sulfuric acid and/or sulfates into the atmostphere. In fact, with the advent of catalytic converters designed to reduce exhaust emissions, the problem of increased sulfur oxide emissions has become sufficiently significant that the efficiency of catalytic converters as a means for reducing exhaust pollutents has come to be seriously questioned.

The prior art has recognized the problems associated with the presence of untreated pollutents such as sulfur oxide compounds in exhaust gases and the effect of these untreated pollutents on catalytic devices employed in the exhaust system to remove various other components. U.S. Pat. Nos. 3,443,886 and 3,429,656, both to Taylor et al, for example, disclose the use of calcium, sodium, and silicon oxides as absorbents which are used in conjunction with catalytic converters to remove the oxides of sulfur. In U.S. Pat. No. 3,429,656 the oxides are actually mixed with the catalyst whereas in U.S. Pat. No. 3,443, 886 they are placed in a "guard chamber" which precedes the catalytic unit in the exhaust treatment train. These prior art devices have, however, not proven to be entirely satisfactory since they require the use of relatively expensive adsorpent compounds which are not self-regenerating and must be replaced periodically.

Other devices of the prior art, such as U.S. Pat. No. 3,657,892 to Perga et al have disclosed the use of adsorbent materials such as carbon for pre-treatment of exhaust gases prior to their entering a catalytic unit.

The prior art has not, however, disclosed or suggested a device or method by which exhaust from internal combustion engines can be treated with self-regenerating materials which are at once inexpensive and effective in removing sulfur compounds together with carbon monoxide, hydrocarbons and nitrogen oxides either prior to treatment of the exhaust gas in a catalytic unit or in lieu of treatment with a catalytic unit.

It is accordingly an object of the present invention to provide an effective means for treating exhaust gases from internal combustion engines in order to remove therefrom sulfur compounds including sulfur oxides as well as nitrogen oxides, carbon monoxides and unburned hydrocarbons.

It is a further object of the present invention to treat exhaust gases from internal combustion engines to remove the indicated impurities using compounds which are readily and inexpensively available in lieu of more expensive compounds suggested by the prior art.

Yet a further object of the present invention to treat the exhaust gases from internal combustion engines in a system that is essentially self-regenerating and which requires only infrequent replacement.

It is still a further object of the present invention to provide a means for treating exhaust gases from internal combustion engines to remove the various impurities including sulfur oxides, carbon monoxide, nitrogen oxides and unburned hydrocarbons therefrom either prior to the exhaust gases being further treated in a catalytic unit or in lieu of treatment in catalytic unit.

According to the present invention it has been found that a substantial portion of the sulfur oxides as well as nitrogen oxides, unburned hydrocarbons and carbon monoxide can be removed from the exhaust of internal combustion engines by treating the exhaust gases in a chamber containing the sulfides and oxides of iron, copper or zinc or combination thereof.

According to one embodiment of the present invention the exhaust gas of an internal combustion engine is treated by passing it through a chamber located upstream of any muffler or catalytic conversion unit employed containing in a first compartment granular or powdered ferrous sulfide and in a second compartment ferric oxide.

Alternatively, the ferrous sulfide and ferric oxide may be mixed together in a single chamber which is also employed in the exhaust train upstream of the muffler or catalytic converter if such a converter is employed, In either of these embodiments sulfur dioxide contained within the exhaust gas first reacts with the ferrous sulfide to produce sulfur vapor and ferric hydroxide. The sulfur vapor produced by this reaction however, reacts along with carbon monoxide present in the exhaust gas with ferric oxide to produce carbon dioxide and additional ferrous sulfide. Therefore, only harmless carbon dioxide is actually emitted from the chamber while sulfur, originally present in the exhaust gas, is ultimately converted to iron sulfide which remains in the unit rather than being passed through to either the atmosphere or a subsequent catalytic converter.

In an additional embodiment of the present invention ferrous sulfate may also be employed in the reaction chamber along with ferrous sulfide and ferric oxide, and reacts with carbon monoxide present in the exhaust gas to form carbon dioxide and additional ferrous sulfide.

Where two zones are employed in the reaction chamber of the invention as described above a further embodiment is that the ferrous sulfide contained in the first zone can advantageously be separated from the ferric oxide contained in the second zone by steel wool or iron gauze. This steel wool or iron gauze, in addition to providing a mechanical separation of the components, also will react with sulfur vapors from the first zone to form ferrous sulfide.

A particular advantage of the present invention is that, as the ferric oxide in the second reaction zone is gradually converted to ferrous sulfide, the sulfide can be used in the first reaction zone and additonal ferric oxide, which is a inexpensive material, used to replace the spent material in the second zone.

While not wishing to be bound by any particular theory, it is nevertheless postulated that the following reactions occur in the process of the present invention:

1. Conversion of $SO_2$ in the exhaust gas occurs with the formation of sulfur according to the reactions:

$$SO_2 + 2FeS + 2H_2O \rightarrow 3S + 2Fe(OH)_2$$
and
$$3SO_2 + 4FeS + 6H_2O \rightarrow 7S + 4Fe(OH)_3$$

While these reactions will occur at ambient or slightly elevated temperatures, temperatures actually encountered in the exhaust system of internal combustion engines may be 800° – 1200° F, thereby resulting in the sulfur formed being in the vapor state.

2. Similarly, nitrogen oxides in the exhaust gas react according to the reactions:

$$NO_2 + FeS \rightarrow S + FeO + NO$$
$$2NO + 2FeS \rightarrow 2S + 2FeO + N_2$$

Thus it will be seen that both sulfur dioxide and nitrogen oxides are converted to sulfur vapor and nitrogen respectively according to the present invention by virtue of their reacting with the metal sulfide.

3. Carbon monoxide, which is also present in the engine exhaust, will however, react with the sulfur vapor formed by the above reactions:

$$CO + S \rightarrow COS$$
and
$$COS + FeO \rightarrow FeS + CO_2$$

Therefore, by employing both the metal sulfide and metal oxide, sulfur dioxide, nitrogen oxides and carbon monoxide are effectively removed from the exhaust gas with the formation of relatively harmless carbon dioxide and nitrogen. Solid products of the reactions which occur are themselves reactants in the process thereby providing a self-regenerating feature to the invention.

4. Additionally, however, ferrous sulfate can be employed to remove carbon monoxide since it will react:

$$FeSO_4 + 4CO \rightarrow FeS + 4CO_2$$

Again, the FeS which is formed finds utility in removal of $SO_2$, $NO$ and $NO_2$ as previously explained.

5. Steel wool or iron gauze can also be employed to remove sulfur formed from the removal of $SO_2$:

$$2Fe + S_2 \rightarrow 2FeS$$

with the ferrous sulfide product being used subsequent additional removal of $SO_2$ and $NO_x$ gases.

It will be understood that all of the above reactions, as well as reactions by which unburned hydrocarbons are removed from the exhaust gases occur within the temperatures and conditions found in exhaust systems of internal combustion engines. Typical such temperatures can be, for example, 800° to 1200° F.

While the particle size of the components employed in the present invention is not particularly critical, it is nevertheless important that the solids not be so fine as to block the flow of exhaust gas therethrough or result in the formation of "channels". On the other hand, if the particles are too large, a poor surface area is presented thereby diminishing the efficiency of the reaction. Typically, granular ferrous sulfide of approximately about 0.05 to 0.25 inch diameter and iron oxide particles ranging from about 0.002 to 0.5 inches are used. Steel wool of approximately 40–50guage wire is satisfactory although any size providing sufficient surface area and being able to retain the materials used without excessive pressure can be employed.

While the relative amounts of the oxide and sulfide components initially present is not particularly critical, they should generally fall within a ratio of about 1–2 parts of oxide to 1 part of sulfide initially. Of course, as the process proceeds, the relative proportions of the components will change.

It is also to be understood that the indicated parameters and conditions for iron sulfide and iron oxide according to the present invention apply also to the equivalent usage of zinc oxide and sulfide and copper oxide and sulfide.

Various configurations can be employed according to the present invention for effecting treatment of engine exhaust gases. As previously noted these systems can be employed alone or in conjunction with a muffler or catalytic converter. A better understanding of the structures of the present invention will, however, be realized by considering FIGS. 1–8 which depict exhaust treatment structures of the invention.

Referring to FIG. 1, in one preferred embodiment of this invention, a first reaction, 1 zone is filled with iron sulfide 3 and a second reaction zone 2 is filled with iron oxide 4 and the engine exhaust gases are passed through each consecutively. After a suitable period of operation, the reaction zones may be switched so that the initially second zone becomes the first and the initially first zone becomes the second. This switching may be accomplished by manually or mechanically interchanging the contents of the reaction zones or by manually or mechanically interchanging the reaction zone containers and contents. Steel wool is employed at 5 to provide separation of the components.

Figure 2A:
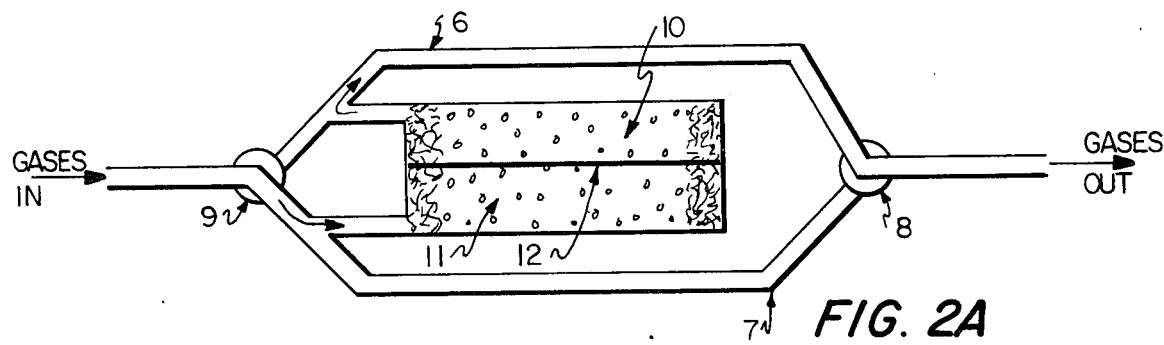
Figure 2B:
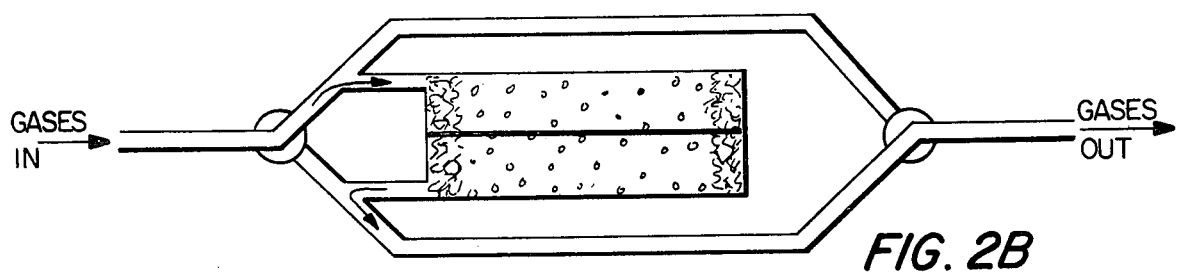

Alternative proceedures are shown in FIG. 2A and 2B whereby parallel conduits are provided at 6 and 7, respectively, so that, by means of valves at 8 and 9, the flow of gas can be changed to flow first through chamber 10 into chamber 11 or vice versa. Gas permeable separation means are provided at 12 to keep the sulfide and oxide apart.

Figure 3:
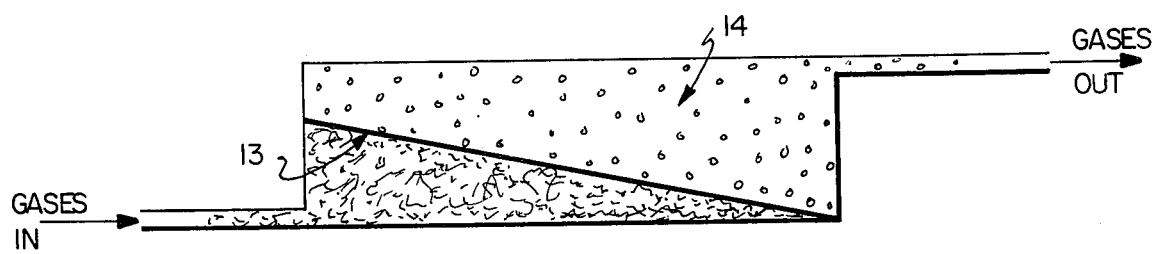

In another embodiment of this invention, a single reaction zone is utilized and provision is made that the reactants and products are mixed as thoroughly as possible and are preferably completely mixed. A device, such as shown in FIG. 3 can accomplish the desired result if initially filled with mixed pellets of iron sulfide and iron oxide, 14. The normal vibration of the engine exhaust system will serve to mix the bed of pellets and the gas will tend to flow in turbulent fashion through the bed. Over a period of time, attrition will produce fine particles which will tend to settle into the supporting mesh 13 and react therein; such attrition will also tend to clean the surface of the pellets in the bed.

Figure 4A:
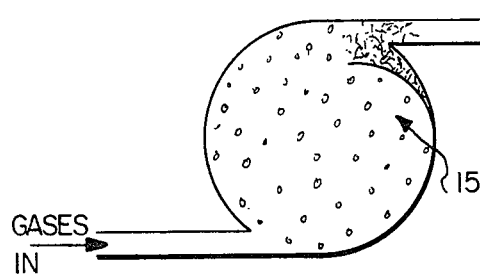
Figure 4B:
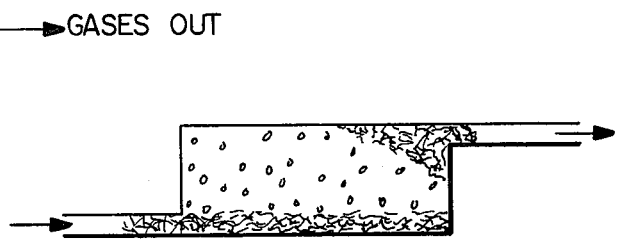

Alternately the flow of gas through the pellet bed 15 can be made to flow in a cirular direction which induces turbulence and provides a mixed reaction zone through a centrifugal action in a device as shown in FIG. 4A, FIG. 4B being the device viewed from above.

Figure 5:
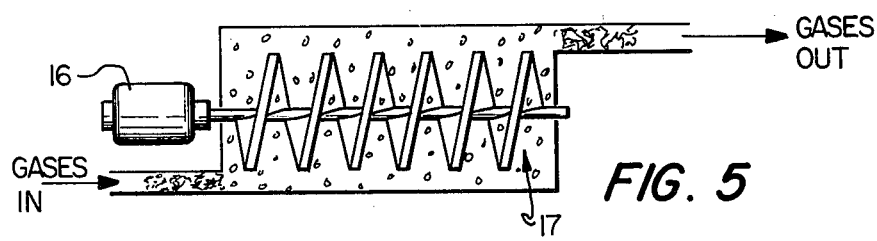

Another method of accomplishing the desired result is to provide a mechanical means such as a motor 16 equipped with a revolving blade for mixing the bed 17 and/or recycling the material at the bed outlet end back toward the inlet end as shown in FIG. 5.

Figure 6:
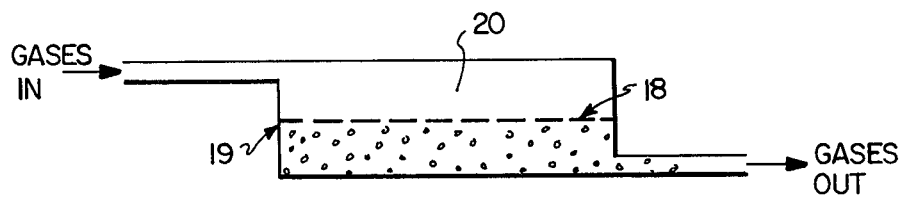

Another method shown in FIG. 6 of accomplishing the desired result is to admit the gases into the reaction zone 20 through a magnetic grid or perforated magnetic plate 18 with the result that the iron sulfide 19 will adhere momentarily to the plate or grid and tend to remain on top of the reaction zone toward the inlet gas side.

Figure 7:
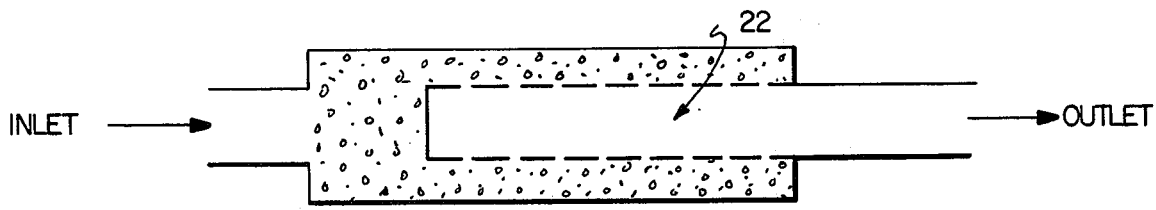

FIG. 7 shows a particularly preferred configuration of the exhaust gas treatment chamber of the present invention whereby a mixed bed of iron sulfide and iron oxide 21 is provided. A perforated or permeable gas outlet conduit 22 projects into the mixed bed to facilitate removal of the treated exhaust gas. Chambers of this type have the additional advantage of providing a sound muffling effect which permits their use in lieu of conventional exhaust system mufflers.

Figure 8:
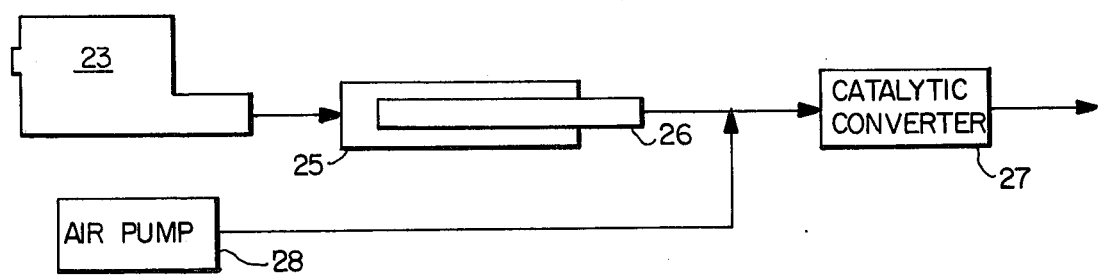

A typical internal combustion engine-exhaust system of the present invention is illustrated schematically in FIG. 8 wherein the engine is shown at 23 with exhaust gases entering the reaction chamber 24 at 25 and leaving the chamber at 26. The optional catalytic converter unit of conventional design is shown at 27 downstream of the reaction chamber. An air pump 28 provides additional air to facilitate the oxidative reaction occurring in the catalytic converter.

EXAMPLE 1

Tests were performed by installing a length of 1 ½ inch diameter pipe on the exhaust pipe of a small (2.5 H.P., 7.5 cu. inch.) gasoline engine. The pipe contained a first (upstream) chamber filled with iron sulfide and a second (downstream) chamber filled with iron oxide. The two chambers within the pipe were separated by a plug of steel wool. When emissions were tested without the pipe being installed on the unit, $SO_2$ was measured at 100 ppm and $NO_x$ at 30 ppm. With the pipe containing iron sulfide and oxide and steel wool in place, $SO_2$ emissions were measured at 20 ppm and $NO_x$ at 5ppm.

Additional tests were performed using the same engine and exhaust treatment configuration and adding small amounts of carbon disulfide to the gasoline used in order to increase $SO_2$ emissions. The results showed 80 percent removal of $SO_2$ and 85 percent removal of $NO_x$.

EXAMPLE 2

Using the configuration shown in FIG. 7 and 8, test were also performed on a 1975 Chevrolet van equipped with a catalytic converter. Ferrous sulfide granules of 1/16 – ¼ inch diameter were employed with iron oxide pellets of ¼ – ½ inch diameter. While no reduction in $NO_x$ was observed, $H_2SO_4$ emissions from the catalytic converter were reduced from 152ppm to 30ppm.

Of course, depending upon the amounts of the various reactants and products as compared with stoichiometric requirements and the reaction conditions, such as temperature, which may favor one reaction or another and/or may affect the physical condition of a reactant or product, such as sulfur, a variety of complex simultaneous and/or consecutive reactions will occur in the practice of the present invention. Since engines, fuels, and operating conditions vary widely and will change the above-mentioned conditions, it is only possible to describe the overall results to be expected within the general range of conditions to be expected. Therefore, if nitrogen oxide is generated at b 3.1 gms per vehicle mile with sulfur dioxide at 0.11 gms per vehicle mile and the reactions proceeded stoichiometrically to completion, a net use of iron oxide would be expected from reaction beds filled with iron sulfur and iron oxide initially. In practice, of course, it is not to be expected that all reactions will proceed to completion, nor will they proceed at equal rates. Additional reactions may also occur to a greater or lesser extent, depending upon conditions in the reaction zone, such as the oxidation of the iron sulfide by any oxygen present.

Time of utility of the reaction chamber bed will depend upon the degree to which the reagent particles can be reduced in size so as to expose maximum surface area, the weight of material charged initially, the sulfur content of the gasoline, and the degree to which the iron sulfide and iron oxide initially charged are converted one to the other and subsequently react again with the exhaust gas. The unit installed on the test vehicle operated for nearly 2000 miles with no decrease in efficiency of $H_2SO_4$ removal. The bed charged with 6 pounds of FeS would be expected to last for 25,000 vehicle miles or more.

EXAMPLE 3

The tests of Example 1 were repeated replacing the iron oxide and sulfide with finely powdered zinc oxide and sulfide respectively. Reductions of $SO_2$ to about 25% of uncontrolled emissions were measured.

EXAMPLE 4

The tests of Example 1 were also repeated replacing the iron oxide and sulfide with finely powdered copper oxide and sulfide respectively. Again, reductions of $SO_2$ to about 25% of uncontrolled emissions were measured.

It is claimed:

1. A process for the removal of sulfur oxides from internal combustion engine exhaust at ambient to 1200° F which consists essentially of passing said exhaust through a chamber containing a chemically reactive mixture consisting essentially of a sulfide and an oxide of a single metal selected from the group consisting of iron, copper and zinc; said sulfide and oxide being initially present in a ratio of about one part of sulfide to 1–2 parts of oxide 2. The process of claim 1 wherein said oxide and sulfide are present in a mixed bed.

3. A process for the removal of sulfur oxides from internal combustion engine exhaust at ambient to about 1200° F which consists essentially of passing said exhaust through a first zone containing the sulfide of a metal selected from the group consisting of iron, copper and zinc and then through a second zone containing the oxide of said metal.

4. The process of claim 3 wherein two zones are separated by steel wool or iron gauze.

* * * * *